United States Patent [19]
Dunipace et al.

[11] 3,736,117
[45] May 29, 1973

[54] DRAWING SHEET GLASS FROM A MASS OF MOLTEN GLASS THROUGH A BODY OF PROTECTIVE MATERIAL

[75] Inventors: Donald W. Dunipace, Perrysburg; William E. McCown, Toledo; Conrad B. Schafer, Maumee, all of Ohio

[73] Assignee: Libbey-Owens-Ford Company, Toledo, Ohio

[22] Filed: July 18, 1966

[21] Appl. No.: 566,086

Related U.S. Application Data

[63] Continuation of Ser. No. 838,304, Sept. 4, 1959, abandoned.

[52] U.S. Cl. ............... 65/32, 65/90, 65/99, 65/193, 65/203, 65/184
[51] Int. Cl. ............... C03b 13/00, C03b 5/32
[58] Field of Search ............... 65/90, 32, 193, 203, 65/99, 184

[56] References Cited

UNITED STATES PATENTS

| | | | |
|---|---|---|---|
| 3,248,193 | 4/1966 | Hohmann | 65/66 X |
| 3,193,365 | 7/1965 | Plumat | 65/182 X |
| 2,754,559 | 7/1956 | Fromson | 65/182 X |
| 2,741,877 | 4/1956 | Dobrovolny | 65/182 X |
| 2,478,090 | 8/1949 | Devol | 65/182 X |
| 2,298,348 | 10/1942 | Coxe | 65/182 X |
| 860,528 | 7/1907 | Colburn | 65/182 X |
| R14,794 | 1/1920 | Colburn | 65/182 X |

*Primary Examiner*—Frank W. Miga
*Attorney*—Nobbe and Swope

[57] ABSTRACT

Drawing sheet glass from a mass of molten glass through a body of protective material. The surface of the mass of molten glass from which the sheet is being formed is covered, and the surfaces of the newly formed sheet are surrounded by, a relatively dense fluid to protect the sheet from adverse temperature and atmospheric conditions in this area. The fluid is inert and non-injurious to the glass at the forming temperatures, and may be either a heavy gas or a light liquid.

9 Claims, 2 Drawing Figures

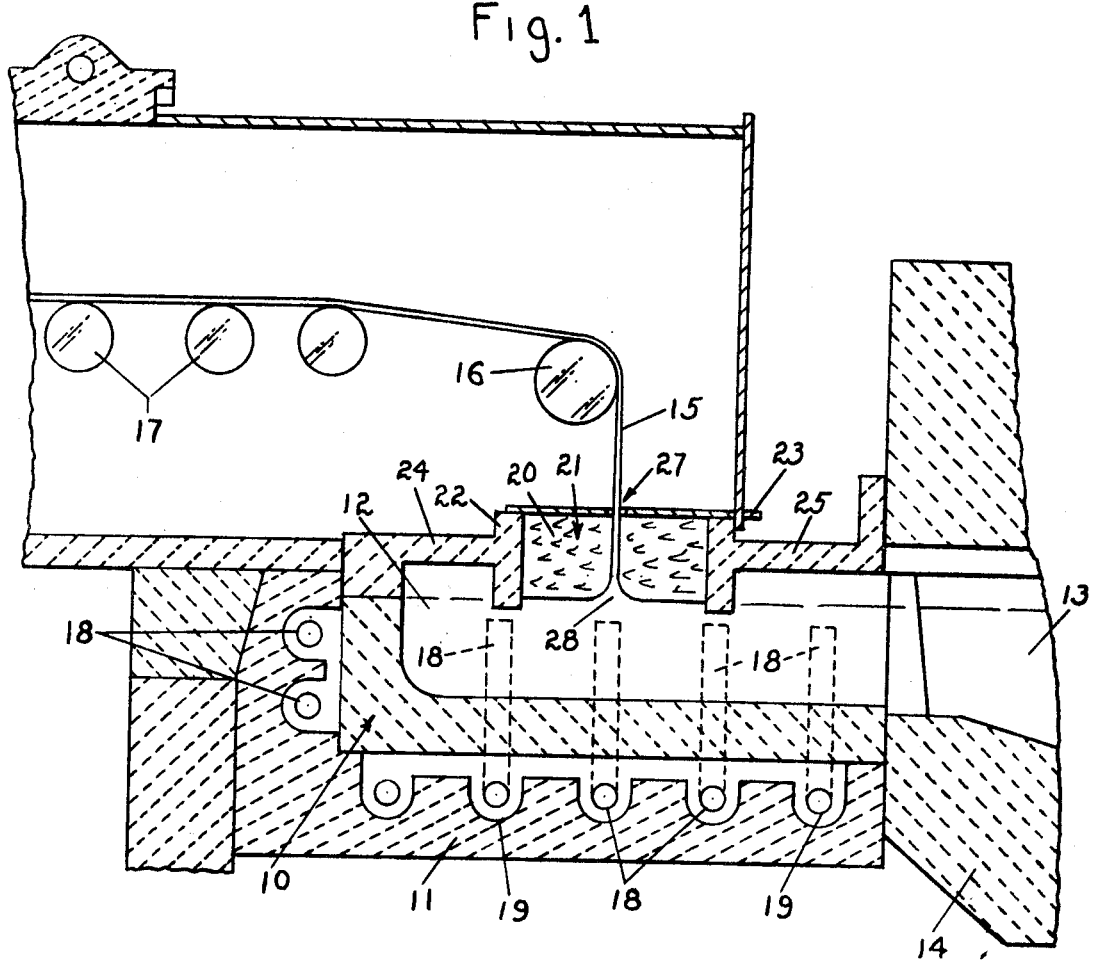

DRAWING SHEET GLASS FROM A MASS OF MOLTEN GLASS THROUGH A BODY OF PROTECTIVE MATERIAL

This application is a continuation of application Ser. No. 838,304, filed Sept. 4, 1959, now abandoned.

The present invention relates to the formation of a sheet or ribbon of glass directly from a mass of molten glass, and more particularly to the treatment of the glass in the zone of sheet formation to prevent distortion defects in the finished sheet.

A sheet or ribbon is formed directly from a mass of molten glass in the production of both plate and window glass. In the former, the sheet may be rough formed into a so-called blank for subsequent grinding and polishing on one or both sides to produce the surface finish required. In the latter, the surfaces are given a fire-finish during formation of the sheet and require no further finishing to impart smoothness and transparency.

However, one of the disadvantages of flat drawn window glass and of "one-side smooth" plate glass blanks has been waviness or so-called "distortion" in the finished product. Such distortion is due to a lack of thickness uniformity or, differently expressed, to alternate thick and thin areas in the glass sheet. Different varieties of distortion are known in the art by various names which have been coined to designate specific types. Among these are "long wave distortion", "short wave distortion", "hammer", "batter" etc.

It is generally conceded that these distortion defects result from a lack of sufficiently uniform temperature conditions from side to side of the mass of molten glass from which the sheet is being formed, and also from the adverse influence of thermally induced air or convection currents that move toward, along and around the newly formed sheet.

We have found that the distortion difficulties that have heretofore been considered to be a characteristic of, and a necessary evil in, commercial window glass, and also in certain forms of plate or demiplate glass, can be eliminated by proper control of the glass temperature and by adequately protecting the newly formed sheet from adverse air currents and non-uniform temperatures that are normally in surrounding relation thereto.

Therefore it is a primary aim of this invention to more accurately control the glass temperatures at the zone of sheet formation, and to protect the sheet being formed therefrom from adverse temperature and atmospheric conditions in this area, whereby to produce a glass ribbon that is substantially free from distortion defects.

Briefly stated, the desired objects are accomplished, in accordance with the present invention, by covering a portion of the surface of the mass of molten glass from which the sheet is being formed and/or by surrounding the surface or surfaces of the newly formed sheet that are to be maintained distortion free with a relatively dense fluid that is inert to the glass at the forming temperatures. The fluid may be either a heavy gas or a light liquid.

Further objects and advantages will become more apparent during the course of the following description, when taken in connection with the accompanying drawings.

In the drawings, wherein like numerals are employed to designate like parts throughout the same:

FIG. 1 is a longitudinal vertical sectional view through the working end of a Colburn type window glass furnace showing the apparatus of the invention incorporated therewith; and FIG. 2 is a longitudinal vertical section through the working end of a plate glass furnace showing the apparatus of the invention located in relation thereto.

Although, as indicated above, this invention is in no way restricted to use in connection with any particular method of forming sheet or demiplate glass, it is particularly well adapted for use with the various types of conventional flat drawn window glass furnaces and will first be described as applied to the so-called Colburn type window glass furnace as a preferred embodiment here.

Referring now more particularly to the drawings, there is illustrated in FIG. 1 the working end of a window glass furnace which is representative of the Colburn type. As shown, the furnace includes a working receptacle in the form of a draw-pot 10 located within a pot chamber 11 and continuously supplied with a mass of molten glass 12 from a stream of molten glass 13 flowing through a cooling chamber 14. In operation, a sheet of glass 15 is drawn vertically from the mass of molten glass 12 in the draw-pot 10 until it has become substantially set in its final form after which, while still plastic, it is bent into the vertical plane over a bending roll 16 and passed over a series of machine rolls 17 to an annealing lehr, not shown. Width maintaining means as knurled rolls, edger blocks or the like not shown are conventionally provided to keep the sheet from narrowing as it is drawn.

In all types of commercial window glass furnaces the glass is produced by feeding glass making materials, known as batch and cullet, into the melting end of a melting tank. The glass making materials are melted in this tank and the molten mass then moves continuously forward into a refining tank after which the completely refined glass advances through an intermediate channel, such as the cooling chamber 14 shown in the drawings, to the working receptacle from which the ribbon or sheet of glass is to be drawn.

During movement of the stream of molten glass between the melting and working ends of the furnace the glass is more or less continuously subjected to changes in temperature. Once the glass has been properly refined every effort is made to maintain the temperature across the stream flowing toward the working end as uniform as possible. However, as a practical matter, with the volume of glass that is normally handled in a commercial window glass furnace, that is extremely difficult to accomplish. The glass at the edge of the stream will naturally be cooler than the glass in the middle of the stream and, due to a variety of conditions that are always present in conventional window glass furnaces, alternate hot and cold streaks as well as lines, spots and areas of different temperatures will usually exist in the glass stream as it approaches the receptacle.

In the Colburn type of window glass machine it is attempted to overcome these non-uniform temperature conditions from side to side of the moving stream of glass from which the sheet or ribbon is to be formed by the provision of a relatively shallow draw-pot such as shown at 10 in FIG. 1, positioned within a heated pot chamber 11. Ordinarily, the pot chamber 11 is heated by gas flames introduced into the chamber through openings in the walls thereof. In this way it is possible to heat the relatively thin layer of glass 12 in the pot substantially uniformly and to so at least partially overcome the non-uniform temperatures in the stream of molten glass once it is in the pot.

However, it has not heretofore been found possible to completely equalize the temperatures of the molten glass from side to side of the draw-pot in this way and, as an ancillary feature of the present invention, we propose to heat the pot chamber electrically so as to more closely approximate the complete uniformity of temperature in the molten glass desired at this point.

To this end, as illustrated in FIG. 1, there may be provided a series of transversely extending electrical heating elements such as "glo bars" 18 located beneath, at the end, and at opposite sides of the draw-pot. These glo bars may be mounted in recesses 19 in the walls of the pot chamber 11 and the recesses may be shaped to reflect the heat in the most efficient manner against the walls of the draw-pot itself.

As pointed out above, lack of uniformity of temperature in the molten glass from which the glass sheet is being drawn is known to be one factor in producing distortion defects in the finished sheet. The other, and perhaps an even more troublesome factor, is the presence of uncontrolled currents of air in previously known window glass furnaces and machines, which air currents move over the surface of the newly formed sheet as it is being drawn and produce the various types of distortion defects already referred to.

These adverse air currents in window glass machines, at the zone of sheet formation (i.e., the zone through which the newly formed sheet moves before it has become set to a degree where it is not adversely affected by surrounding atmospheric conditions, and which lies between that point and the point where the sheet emerges from the mass of molten glass) arise from a number of different sources. For example, both the molten glass in the draw-pot and the rising sheet are at relatively high temperatures. Consequently air in contact with the surfaces thereof will tend to rise. On the other hand, it is necessary to use various types of cooling apparatus in window glass machines, and the air in contact with the surfaces thereof will tend to move downwardly. Moreover, there is a rather wide variation in the temperature of the various parts of the mechanism of the window glass drawing machine and the temperatures of these parts will have a corresponding action on the movements of the air that is in contact therewith. As a result of these thermally induced air currents within the machine, at or closely adjacent to the zone of sheet formation, there is normally considerable turbulence in this air as well as an objectionable variation in the temperature of the atmosphere surrounding the glass sheet. Still another cause of uncontrolled air currents in conventional window glass drawing machines is the fact that the lehr into which the glass sheet is passed from the machine exerts a stack action and tends to withdraw air from and induce air currents in the machine enclosure.

Many attempts have been made in the prior art to overcome these undesirable atmospheric conditions in window glass machines, and particularly in the zone of sheet formation, either by attempts to control the air movements in the machine or to dampen or substantially prevent such movements. These attempts have met with some success, but to date they have not provided a complete solution to the problem.

The present invention, on the other hand, adopts a different approach to the problem, and solves it by positively preventing any contact between the newly formed glass sheet and the air within the machine in the critical area of the zone of sheet formation.

The invention further contemplates, in the preferred embodiment, the prevention of distortion defects in the finished sheet by improving the temperature uniformity in the restricted area of the upper portion of the molten glass in the working receptacle from which the sheet or ribbon is being directly drawn.

Thus, as shown in FIG. 1 of the drawings, there is provided, above the molten glass in the draw-pot and in surrounding relation to the glass sheet being drawn therefrom, a body of fluid 20 through which the glass sheet 15 can move in its formative stage. Although the body of fluid 20 may be arranged above and out of contact with the mass of molten glass 12, so long as it surrounds the rising sheet in the zone of sheet formation (indicated generally at 21), it is preferred that the fluid body rest on the surface of the molten glass in the pot 10 because in this way it serves a two-fold purpose. In other words, it not only completely protects the rising sheet from contact with air currents that normally exists in surrounding relation thereto but, in addition, the body of fluid 20 acts to stabilize and to render more uniform the temperature of the molten glass in the upper strata of the mass 12 in the restricted area thereof from which the sheet is being drawn.

It will be obvious that for this purpose, as well as to insure the proper degree of temperature at the surface of the sheet 15 and the surface of the mass 12, suitable heating and/or cooling means for the fluid body 20 can be provided in ways well known in the art. The fluid body can be retained in the desired location relative to the glass sheet in the molten mass 12 by any suitable enclosure or container. For example, as illustrated in FIG. 1, the container for the side walls of the container for the fluid 20 may be provided by substantially vertical portions 22 and 23 of members 24 and 25 which are roughly similar to the conventional lip-tiles commonly used in Colburn type window glass machines. End walls 26 for the fluid body container may be formed as extensions on the side walls of the pot 10, or may be formed integral with the portions 22 and 23, or may be independent members suitably secured thereto as desired. A cover 27, having an opening through which the glass sheet may pass, can also be provided. The cover 27 may be dispensed with when a heavy gas is used as the fluid body 20 since such gas, being heavier than air, will remain in place in an open container. However, where molten metal is used as the fluid body, the cover 27 may be important in preventing oxidation of the metal and for this purpose it may be necessary in some instances to provide a layer of a reducing or other non-oxidizing gas over the fluid body. The height of the container for the fluid body must be such that the fluid completely surrounds the glass sheet during the critical period of its formation and so that the sheet will not emerge from the fluid body until it has passed the point where distortion defects can be caused therein by adverse air currents.

The size of the surface area of the mass of molten glass 12 that lies beneath the fluid body 20 may be relatively small since to obtain the desired action of the fluid body on the glass sheet it is only necessary that the sheet be surrounded thereby. Similarly the most critical portion of the mass of molten glass 12, so far as uniformity of temperature is concerned, is the portion immediately adjacent the meniscus 28 at the juncture of the molten glass and the rising sheet. Obviously, however, the larger the surface area of the mass of molten glass upon which the fluid body 20 can act the greater the stabilizing effect it will have on the molten glass temperature. For this reason it may be desirable to move the walls 22 and 23 nearer to the ends of the pot 10 depending on the degree of stabilizing effect desired.

In any event the members 24 and 25 will act as covers for that portion of the molten glass in the draw-pot that does not lie directly beneath the fluid body 20 and these covers will assist in maintaining the desired temperature in the molten glass. Although the ends of the portions 22 and 23 of the members 24 and 25 have been shown as extending downwardly into the molten glass of the mass 12 they can of course be raised to a point at/or very slightly above the surface of the molten glass. However, when used as shown, they will act to skim the surface of the molten glass and to introduce sub-surface glass into the strata from which the sheet is to be drawn.

When the apparatus of this invention is employed in connection with a Colburn type window glass drawing machine in the manner just described, the temperature uniformity of that portion of the mass of molten glass from which the sheet is drawn will be notably improved and, since the sheet itself will be completely protected from the injurious effects of adverse air currents at the critical period in its formation, the finished sheet will be found to be substantially free of distortion defects.

As indicated above, the fluid in the body 20 may be any heavy gas or light liquid that will be substantially inert and non-injurious to the glass with which it comes in contact. An example of a suitable gas is xenon and an example of a suitable liquid is molten metal, preferably one that is lighter than the molten glass.

As indicated above, in addition to its value in connection with the production of flat drawn window glass, the present invention will also be useful in producing so-called demiplate glass, i.e., glass sheets having physical characteristics that closely approximate that of commercial ground and polished plate but in which at least one surface has not been subjected to the conventional grinding and polishing treatment in obtaining the desired degree of smoothness and transparency.

One form of apparatus that can be used in producing such glass has been illustrated in FIG. 2 of the drawings. As will be seen, this apparatus is substantially the same as is commonly used in producing conventional plate glass blanks by the horizontal forming method and includes the working end of a plate glass furnace, indicated generally at 28, through which a stream of molten glass 29 flows to the pass 30 between a pair of forming rolls 31 and 32.

In producing plate glass blanks on such a machine the rolls 31 and 32 usually have fluted or otherwise roughened surfaces to facilitate rolling the molten glass from the stream 29 into sheet form between the rolls. With rolls of this character, the ribbon or sheet formed thereby is known as a rough blank because the opposite surfaces thereof carry the roughened impression of the rolls and subsequently have to be ground on those surfaces to remove the roughened layer and present a smooth surface which can be polished to give the desired transparency to the final product.

Recently, however, considerable work has been done in forming a glass sheet or ribbon by techniques that are generally similar to conventional plate glass forming techniques but in which at least one side of the sheet is formed with a smooth transparent surface having a finish similar to the fire-finish obtained in flat drawn window glass. The purpose of this is to obtain a product at least roughly comparable to commercial ground and polished plate glass while at the same time saving the cost of grinding and polishing at least one surface of the blank. One outstanding potential of such demiplate glass lies in the field of laminated safety glass where, by laminating the unground and unpolished surfaces to the inside where they will be in contact with the relatively soft plastic interlayer of the laminated sandwich, a product that is in every way comparable to one made with commercial plate glass that has been ground and polished on both surfaces can be obtained.

Such demiplate glass can be produced on conventional plate glass forming machines in a number of different ways. For example, with the apparatus shown in FIG. 2 of the drawings, it can be accomplished by making either the roll 31 or the roll 32 smooth instead of rough and, in some instances, by spinning the smooth surface in contact with the glass. Ordinarily, it is preferable to make the surface of the upper roll smooth, because the upper surface of the rolled sheet can be maintained out of contact with any mechanical supporting means that might injure the smooth surface until the sheet has become set to a point where it will not be adversely influenced thereby. However, by the use of the proper kind of supporting means a similar effect can be obtained by making the lower roll smooth, and good results have also been obtained with both rolls provided with smooth surfaces.

The smooth surface that is produced on the rolled sheet, whether it be on either of one or both sides thereof, is subject to distortion defects in the zone of sheet formation, i.e., immediately after emerging from the pass between the rolls, in much the same way as is a newly formed sheet of flat drawn window glass. Also, as in the case of the flat drawn window glass, the smooth surface of the rolled sheet can be protected from the atmospheric causes of such defects by the present invention.

To adapt the invention to a sheet glass rolling machine it is only necessary to provide a container 33 which will enclose a body of fluid 34 and maintain it in contact with the smooth surface or surfaces of the rolled sheet 35 as it is formed. The shape of the container 33 will depend of course on the particular type of roll forming apparatus with which it is used since it must be formed and positioned in a manner to contain the fluid body with the least possible leakage and to adequately cover the smooth surface of the glass. Thus, a container such as shown in FIG. 2 of the drawings will protect a newly formed sheet which has either one or both surfaces smooth; and the upper portion may be dispensed with where only the lower surface is smooth or the lower portion may be omitted when the upper surface only is smooth. If a heavy gas is employed as the fluid body, the top wall 36 of the container 33 can of course be eliminated and in any event a constant level of fluid in the container can be maintained by the introduction of new fluid, to replace any which may be lost, as through a supply conduit 37.

It is to be understood that the forms of the invention herewith shown and described are to be taken as illustrative embodiments only of the same, and that various changes in the shape, size and arrangement of parts, as well as various procedural changes may be resorted to without departing from the spirit of the invention or the scope of the subjoined claims.

We claim:

1. In a method of producing a glass sheet, the step of drawing the same from a mass of molten glass through a body of a gas that is heavier than air.

2. In a method of producing a glass sheet, the step of drawing the same from a mass of molten glass through a body of liquid.

3. In a method of producing a glass sheet, the step of drawing the same upwardly from a mass of molten glass through a body of molten metal.

4. A process for drawing sheet glass from a molten glass bath so as to protect the sheet being formed from the cold ambient gas currents in the drawing chamber that are capable of disturbing the required thermal homogeneity of the glass in such sheet, comprising drawing the glass in sheet form from the glass bath upwardly through a mass of material non-adherent to glass and capable of protecting the glass while it is being drawn therethrough against said ambient gas currents, the material in said mass being inert to molten glass and having a density less than that of the molten glass, and said mass of material floating as a liquid layer on the glass bath so as to cover the area thereof from which the glass sheet is drawn at the drawing station and being of sufficient depth to cover substantially the gather from which the sheet is formed, the molten glass drawn upwardly through said mass of material being in direct contact with such material during its passage through such mass, and said liquid layer of material shielding the molten glass being drawn therethrough against said cold air currents and increasing the rate of surface congealment of the glass sheet so as to reduce the effects of such cold air currents thereon.

5. A process such as defined in claim 4, in which said floating mass of material is contained in a chamber of given horizontal area and is in communication at its bottom with the glass bath, and introducing into such chamber matter capable of maintaining said mass of material therein in condition suitable for such shielding action and for effecting such surface congealment action on the glass.

6. A process such as claimed in claim 5, in which said matter introduced into said chamber is a cooling medium to the cooling action of which the glass sheet is exposed as it travels through said chamber to the exit end thereof, to bring the glass sheet to a state of surface congealment such that it can no longer be substantially modified by the cold air currents in the drawing chamber.

7. A process such as defined in claim 5, in which said matter introduced into said chamber is directed onto said mass of material so as to form a protective cover therefor.

8. Apparatus for drawing sheet glass from a molten glass bath and through a drawing chamber, comprising a mass of material floating as a liquid layer on the glass bath at a given portion thereof so as to cover the area thereof from which the glass sheet is drawn, means for maintaining said material floating on said glass bath at said given portion as a liquid layer of substantial height and of a length greater than the width of said glass sheet, and means for drawing glass in sheet form from the area of the glass bath covered by said mass of material and upwardly through said mass of material and into the drawing chamber, the material of said mass being inert and non-adherent to molten glass and being in direct contact with the glass sheet drawn therethrough, and capable of shielding the glass with which it is in contact against cold air currents in the drawing chamber and of increasing the rate of surface congealment of such glass sheet so as to reduce the effects of such cold air currents thereon.

9. Apparatus such as defined in claim 8, including heating means provided in said maintaining means to heat said mass of material.

* * * * *